Figure 1:
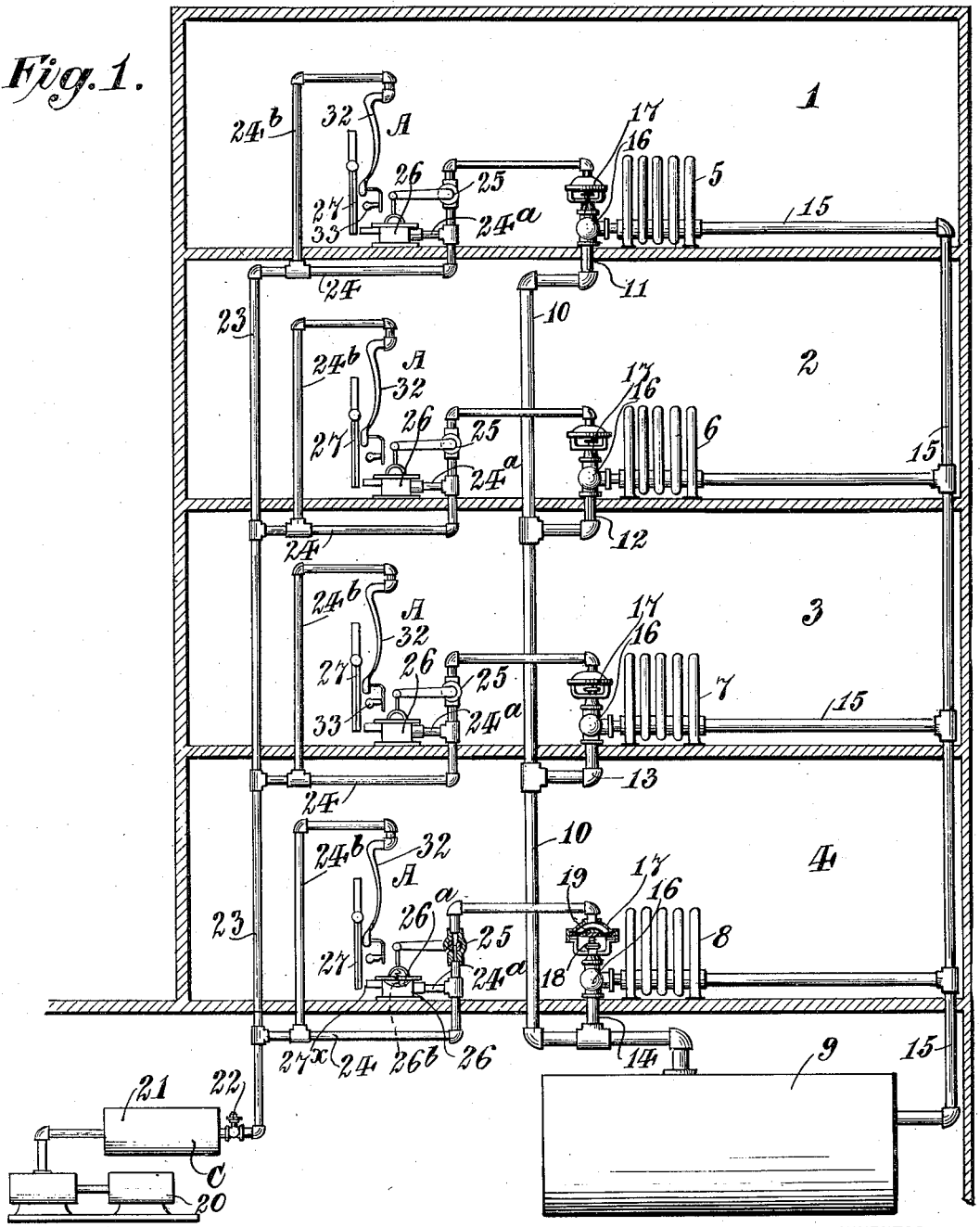

J. F. GALLAGHER.
APPARATUS FOR REGULATING TEMPERATURE.
APPLICATION FILED JULY 30, 1914.

1,149,819. Patented Aug. 10, 1915.

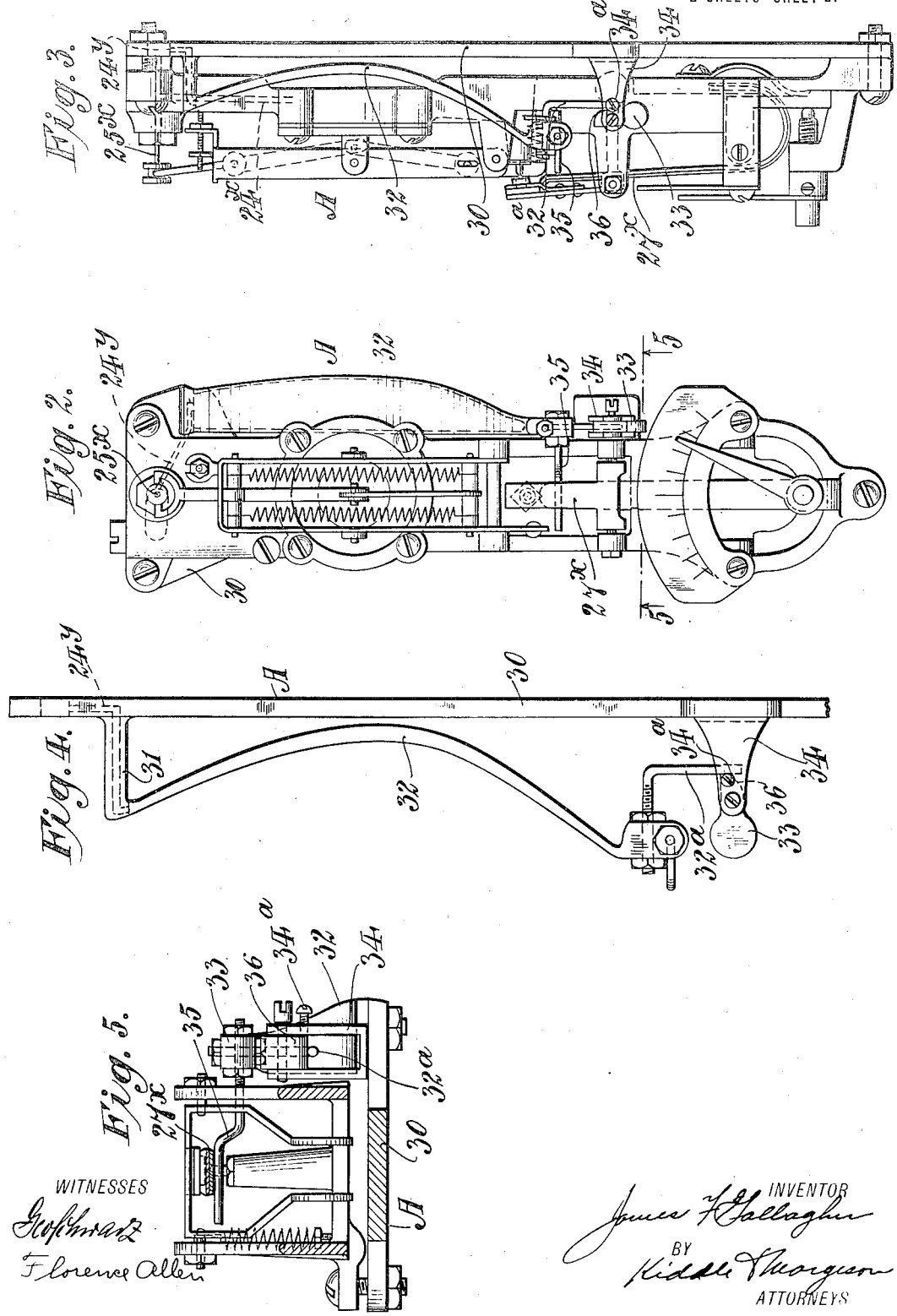

UNITED STATES PATENT OFFICE.

JAMES F. GALLAGHER, OF NEW YORK, N. Y., ASSIGNOR OF ONE-HALF TO PETER J. LAVELLE, OF NEW YORK, N. Y.

APPARATUS FOR REGULATING TEMPERATURE.

1,149,819.   Specification of Letters Patent.   Patented Aug. 10, 1915.

Application filed July 30, 1914. Serial No. 854,053.

*To all whom it may concern:*

Be it known that I, JAMES F. GALLAGHER, a citizen of the United States of America, residing in the borough of Brooklyn of the city of New York, county of Kings, and State of New York, have invented certain new and useful Improvements in Apparatus for Regulating Temperature, of which the following is a specification.

Several different types of apparatus are at present in use for automatically controlling the supply of a heating medium, such as steam or hot water to a radiating member whereby when the heat of the room in which the radiator is located reaches a predetermined temperature, the flow of the heating medium will be diminished or else entirely cut off, and whereby when the temperature of the room falls below a predetermined temperature the heating medium will be either supplied to the radiator should it have been previously cut off or else the supply of the heating medium will be increased in quantity if some were being supplied at that time. An apparatus for accomplishing this purpose is illustrated in the patent to Johnson No. 733,210. In the construction shown in said patent the temperature of the room is indirectly dependent upon the position of an indicator arm that is positioned over and in reference to a marked dial. In such a construction, as the Johnson construction, the flow of the heating medium to the radiator is controlled by a primary valve that is directly connected to a primary valve motor. This primary valve motor is connected to a separate source of fluid supply such as air under pressure, and the flow of operating air to the primary valve motor is controlled by a secondary valve, that is in turn connected to an air operated secondary valve motor whose operation is controlled by a thermostatic sensitive member often referred to as a thermostatic valve. This thermostatic valve is dependent for its operation upon the position of the indicator arm which is positioned over the marked dial. The device comprising this thermostatic valve, the indicator arm, and the dial is known in the trade as a thermostat, and its adjustment is quite delicate. For this reason, when the thermostat in any particular room has been once set to maintain the proper normal temperature of said room, viz., the temperature desired when the room is to be occupied, it is desirable not to move the indicator arm for such purposes as cutting off or diminishing the supply of heating medium to the radiator when the room is not to be occupied.

In apparatus such as is shown in the Johnson patent or such as is illustrated in the accompanying drawings, when the temperature of the room rises as high as is normally required, the thermostatic valve therein (as 27, see Figure 1 or $27^x$, see Figs. 2 and 3) opens, thus permitting a spring (as $26^a$ see Fig. 1) of the secondary valve motor (as 26) to cause the secondary valve (as 25) to open whereby air under pressure can be supplied to the primary motor in order to close the primary valve (as 16) against the pressure of a spring which is in said primary valve motor.

The pressure of the air for operating the motors above referred to is normally maintained constant and uniform as for example, at fifteen pounds. At night, however, in such buildings as schoolhouses or the like, in order to save fuel, it is desirable to shut off the heat from all rooms except such as may be desired to be occupied.

In a companion application, namely application Serial No. 812,952, filed by myself on June 19, 1914, there is illustrated and described an apparatus and method whereby by changing the pressure of the air supplied to said primary and secondary valve motors as, for instance by dropping the air pressure fifty per cent. during the night, some of the primary valves will be closed while the rest will remain open due to the bringing into operation of a new device or attachment. An apparatus embodying said new device or attachment and the new method of operating the apparatus for controlling the flow of heating fluid by changing the pressure of air supplied to the valve operating motors is fully described and broadly claimed in said application above identified. According to said pending application said particular device or attachment when more specifically described, operates to assist the secondary valve motor in the opening of the secondary valve when the pressure of the air supplied to the secondary valve motor has been reduced and is not sufficient to cause the secondary valve motor to alone move said secondary valve.

According to the present invention the air for operating the said valve motors is preferably maintained at fifteen pounds pressure during the day, and the pressure of the air is changed for the night operation, as for instance by dropping it one-third, but according to the present invention a device or attachment is preferably brought into coöperation with the thermostatic sensitive valve of the thermostat. This device or attachment is also constructed so that it will automatically be rendered inoperative when the pressure of the air is normal, for instance at 15 pounds.

As showing a specific embodiment of the invention, reference is made to the drawings, in which—

Fig. 1 is a diagrammatic view illustrating a system for regulating the temperature of a room. One form of the device or attachment which enables the present invention to be realized being indicated thereupon by the reference character A. Figs. 2 and 3 are respectively a front and side elevation of a thermostat to which there is secured the device or attachment A. Fig. 4 is a side view of the attachment A, and Fig. 5 is a sectional view taken on the line 5—5 of Fig. 2 looking in the direction of the arrows.

In Fig. 1 the several rooms or compartments 1, 2, 3 and 4, are respectively heated by the radiators 5, 6, 7, and 8 contained therein. It will be manifest that while the radiators are illustrated as being located directly in the rooms, that as far as the present invention is concerned the radiators might be located in air conduits leading to the rooms whereby indirect heating may be effected.

Reference character 9 indicates the boiler or heater; 10 the main supply pipe leading therefrom; 11, 12, 13 and 14 the branches leading from the main supply pipe to the radiators. The return piping is indicated by 15. The flow of heating medium through the several branch supply pipes is controlled by the primary valve 16, there being a primary valve for each radiator. This primary valve is operated by a primary valve motor 17 which has a spring 18 that normally tends to open the primary valve in order to permit the flow of heating fluid through the radiator. This motor has the flexible diaphragm 19 that is arranged so that when air is supplied to the motor the diaphragm can force the primary valve to closed position against the pressure of said spring.

Reference has heretofore been made to the air supply for the primary motor. The means for supplying the air under pressure is indicated by C and comprises the pump 20, the reservoir 21, the regulating or reducing valve 22, the main air pipe 23, and the several branches of the latter, namely 24, that lead to the primary valve motors 17. The several branches, 24, of the air supply are controlled by the secondary valves 25, that are actuated by the secondary valve motors 26, which are in turn controlled by the thermostatic valve member 27. These secondary motors 26 each comprise the diaphragm $26^a$ and the spring $26^b$ and they are connected as by pipes $24^a$ to the several branches 24 of the air supply. When the thermostatic sensitive valve 27 is open thus releasing the pressure of the air on diaphragm $26^a$ then the spring $26^b$ operates to maintain open the secondary valve 25. The primary valve motor 17, the secondary valve 25, the secondary valve motor 26, and the thermostatic valve 27 are connected in a manner similar to the corresponding members shown in the Johnson patent above referred to and they are similar in their function and mode of operation as the corresponding members shown in said patent. Therefore, further description of these members and their mode of operation at the present time is believed to be unnecessary. These members, namely the primary valve motors 17, the secondary valves 25, the secondary valve motors 26, and the thermostatic valve 27, have been selected as illustrating one type of apparatus which may be utilized to position the primary or radiator valves (as 16) in order to regulate the flow of a heating medium to radiators; but it is to be understood that other forms of apparatus for controlling said flow of heating medium to the radiators and which accomplish the desired end may be utilized.

According to the present invention a device or attachment A is provided and this attachment is arranged to coöperate with one or more of the members of the apparatus or system that controls the flow of heat to the radiator. This device or attachment is illustrated in Fig. 4 and comprises a frame 30, the forwardly extending hollow arm 31, a hollow bow-shaped (Bourdon) tube 32, a depending adjustable arm $32^a$, which is carried on the free end of said tube, and a weighted cam-shaped member that engages said last mentioned arm and which weighted member is in turn pivotally mounted on an arm 34 that is on the lower end of the frame 30. The upper end of the (Bourdon) tube 32 is secured to the outer end of the arm 31 in communication with the interior of said arm.

The secondary valve 25 found in the diagrammatic figure, namely in Fig. 1, is realized in a commercial application by the secondary valve $25^x$ in Figs. 3 and 4. The branch pipes or passageway 24 is realized in its practical commercial application by passageway $24^x$, see Fig. 3. This passageway $24^x$ is also in communication as by the passageway marked by $24^y$ in Figs. 2, 3, and 4, with the interior of the bow-shaped tube 32 so that air under pressure can be supplied directly to this tube 32. The passageway 24<sup>y</sup> in Figs. 2, 3, and 4 finds its equivalent in the pipe designated as 24<sup>b</sup> in Fig. 1.

It is a well known fact that a hollow bow-shaped tube (such as 32 and which is known as a Bourdon tube) when supplied with air or other fluid under pressure tends to straighten out, and this principle is taken advantage of in the present invention. From an inspection of Figs. 2 to 5 inclusive, it will be noted that an adjustable laterally extending arm 35 is secured to the lower free end of the bow-shaped tube 32. This laterally extending arm 35 projects under the thermostatic sensitive valve 27<sup>x</sup> that corresponds to the thermostatic valve 27 in Fig. 1. When no pressure is exerted on the interior of the tube 32 the lower end of the latter through the intermediary of the laterally extending arm 35 maintains the thermostatic sensitive valve 27<sup>x</sup> open. When air under the pressure say of 15 pounds is supplied to the interior of tube 32, the latter straightens out, or at least tends to, thus causing the lower free end of the tube to move toward the frame 30 a sufficient amount whereby said laterally extending arm 35 cannot engage the thermostatic valve 27<sup>x</sup>. The construction is such, however, that in case the air pressure is reduced, for example one-third, say to 10 pounds, then the lower free end of the tube 32 will be only partially retracted. Consequently under such conditions the arm 35 can engage and can maintain open the thermostatic valve 27<sup>x</sup>, thus permitting the spring 26<sup>b</sup> in the secondary valve motor to actuate the secondary valve whereby the latter motor can be moved to open position in its casing, thus causing the primary valve to be closed against the spring 18, whereby the heating medium can be shut off from the radiators in which the particular thermostat having the parts in question is located. Manifestly the construction just described will not permit, when the pressure is reduced (say to 10 pounds) the flow of heating medium to each of the radiators, and the supply of heating medium will remain shut off unless the lower free ends of the tube 32 in the rooms desired to be heated is retracted in some manner so that said tubes 32 cannot exert a pressure against the secondary valves in a direction tending to open said valves.

In order to accomplish the retracting of the lower end of the tube 32 the weighted cam member 33 has been provided. This weighted cam member 33 is moved by hand from the position shown in Fig. 3 to the position shown in Fig. 4 and the construction is such that when in the position shown in the last mentioned figure and when the pressure of the air supply is only 10 pounds, for example, then there is sufficient friction between the cam surface 36 and the depending arm 32<sup>a</sup> so that the cam will maintain the lower end of the tube 32 retracted whereby the laterally extending arm 35 will be out of engagement with the secondary thermostatic valve 27<sup>x</sup> until the weighted cam member 33 is either moved by hand to the position shown in Fig. 3 or until the air pressure has been restored to normal, say 15 pounds. When the air pressure is restored to normal the lower free end of the tube 32 will be moved toward the frame 30 a sufficient amount for the cam member 33 to be automatically disengaged whereby the weighted portion thereof will automatically return said member to the position shown in Fig. 3.

It will thus be observed that in the construction shown and described in this application, a member, namely the cam member 33, is actuated by hand if the room in which the thermostat is located is to be heated when the pressure of the air supply is reduced. In a school building, when a number of rooms are being used every evening for the school year or term, the engineer or the person in charge of the heating thereof places cam member 33 in the position shown in Fig. 4 and then sets up or tightens the screw 34<sup>a</sup> against said cam member 33, thus holding the latter in said position shown in Fig. 4. This will only be necessary at the beginning of the heating season or school term, and all of these rooms will be always heated, both when the pressure is at normal 15 lbs. pressure, and also when the pressure is reduced to 10 lbs., viz. to the abnormal pressure. It will also be noted that all of the rooms can have the heat supply automatically controlled by merely raising to the normal amount the pressure of the air which is supplied to the interior of the tube 23 and to the various motors. As above indicated, while the invention has been described as being used in conjunction with the Johnson type of apparatus for controlling the supply of heating fluid to radiators, still it is manifest that the invention may be applied to other types of apparatus for controlling the flow to radiators.

It will be apparent that the device could be constructed so that the heat could be supplied automatically when the air pressure is at normal and also when it is at other than normal—in other words, so that by actuating the small cam the heat to the radiator would be cut off rather than supplied to the radiator when the air pressure is at other than normal. Moreover, the improvements herein set forth are not limited to the precise construction and arrangement shown and described as they may be embodied in various forms and modifications without departing from the spirit and scope of the claims.

What I claim is—

1. A heating system comprising radiators, a primary valve for controlling the flow of heating medium to said radiator, a motor for operating said valve, means for supplying air under pressure for said motor, means comprising a thermostatic valve for regulating the amount of air supplied to said motor, and means connected to said air supply and comprising a "Bourdon" tube which is arranged to exert a pressure against said thermostatic valve when the pressure of the air supply to the interior of said tube is at one pressure and arranged to be retracted from said thermostatic valve when the pressure of said air supply is materially changed.

2. A heating system comprising a radiator, a primary valve, a primary valve motor which is connected to an air supply, a secondary valve, a secondary valve motor, also connected to the said air supply, a thermostatic valve and means connected to the air supply, and arranged to coöperate with said thermostatic valve to move the latter when the air is below the normal pressure and so that when the air is at its normal pressure said last mentioned means will be rendered inoperative.

3. A heating system comprising a plurality of radiators, a primary valve for each radiator, a primary motor for each primary valve, means for supplying air to each of said motors, a secondary valve, a secondary valve motor, a thermostatic valve for regulating the flow of air to each of the primary valve motors, a "Bourdon" tube for each of said thermostatic valves, which tube is also connected to the air supply and arranged so that when the air is at normal pressure said tube will be rendered inoperative and so that when the air is below its normal pressure said tube can remain operative and means whereby the position of any of said tubes in the system can be rendered inoperative during the period that the air is maintained below its normal pressure.

4. In combination with a thermostat having a valve that controls the flow of air from an air supply to which the thermostat is connected, of a device or attachment comprising a bow-shaped tube provided with a passage-way leading to the interior thereof so that the interior of said tube is in communication with said air supply, and a weighted member arranged to hold the free end of the tube in retracted position so that said tube will be held from moving a valve that controls the flow of air from said supply.

5. In combination with a fluid operated motor and a thermostatically controlled valve, of an upright frame, a forwardly extending projection at the upper end of said frame, a bow-shaped tube depending from said projection, a laterally extending arm at the lower free end of said tube for engaging, when desired, said valve, a member that is connected to said valve, a depending arm carried at the lower free end of said tube, a forwardly extending arm on the lower end of said frame, and a weighted cam-shaped member pivotally mounted on said last mentioned arm and arranged to engage the depending arm on said tube.

6. A thermostat comprising a motor for operating a valve, and a thermostatic valve for controlling the operation of said motor, said thermostat having in combination therewith, or as a part thereof, a "Bourdon" tube and a weighted cam arranged so that it can be positioned in a manner to hold in a retracted position the free end of the tube so long as a constant pressure is maintained within the tube, said weighted cam also being arranged so as to automatically move relative to the free end of the tube in a manner to release said free end when the pressure within the tube is raised, the Bourdon tube being operatively associated with said valve which regulates the operation of a motor.

This specification signed and witnessed this 28th day of July, A. D., 1914.

JAMES F. GALLAGHER.

Signed in the presence of—
Asa B. Kellogg,
Edwin A. Packard.